United States Patent
Nilsson et al.

(10) Patent No.: US 7,389,112 B2
(45) Date of Patent: *Jun. 17, 2008

(54) MOBILE TERMINAL FOR OPTIMAL SPECTRUM UTILIZATION IN CELLULAR SYSTEMS

(75) Inventors: Johan Nilsson, Malmo (SE); Bengt Lindoff, Bjärred (SE); Torgny Pallenius, Löddeköpinge (SE); Dag Åkerberg, Kungsängen (SE); Kimmo Hiltunen, Esbo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 625 days.

This patent is subject to a terminal disclaimer.

(21) Appl. No.: 10/233,550

(22) Filed: Sep. 4, 2002

(65) Prior Publication Data
US 2003/0109257 A1  Jun. 12, 2003

Related U.S. Application Data

(60) Provisional application No. 60/361,338, filed on Mar. 5, 2002, provisional application No. 60/336,715, filed on Dec. 7, 2001.

(51) Int. Cl.
*H04Q 7/20* (2006.01)
(52) U.S. Cl. .................. 455/444; 455/447; 455/448
(58) Field of Classification Search ............. 455/436, 455/437, 438, 552.1, 439, 442, 443, 444, 455/522, 226.2; 370/331, 332, 335, 342, 370/441

See application file for complete search history.

(56) References Cited

U.S. PATENT DOCUMENTS

| | | | |
|---|---|---|---|
| 5,487,174 A | | 1/1996 | Persson |
| 6,094,427 A | | 7/2000 | Yi |
| 6,104,933 A | * | 8/2000 | Frodigh et al. ............... 455/522 |
| 6,161,013 A | * | 12/2000 | Anderson et al. ........... 455/437 |
| 6,201,795 B1 | | 3/2001 | Baum et al. |
| 6,201,972 B1 | * | 3/2001 | Hamabe ...................... 455/450 |
| 6,690,936 B1 | * | 2/2004 | Lundh ......................... 455/436 |
| 6,826,410 B2 | * | 11/2004 | Simonsson et al. .......... 455/506 |
| 2002/0071480 A1 | * | 6/2002 | Marjelund et al. .......... 375/141 |
| 2002/0172163 A1 | * | 11/2002 | Chen et al. .................. 370/281 |
| 2003/0109284 A1 | * | 6/2003 | Akerberg et al. ............ 455/561 |

FOREIGN PATENT DOCUMENTS

| | | |
|---|---|---|
| EP | 1058412 | 12/2000 |
| WO | 02/37888 A1 | 5/2002 |

OTHER PUBLICATIONS

Standard Search Report dated May 14, 2003.
First Written Opinion mailed on Nov. 7, 2003 in connection with counterpart International Application PCT/EP02/13792.
Second Written Opinion mailed on Feb. 24, 2004 in connection with counterpart International Application PCT/EP02/13792.

* cited by examiner

*Primary Examiner*—Temica Beamer
(74) *Attorney, Agent, or Firm*—Potomac Patent Group PLLC

(57) ABSTRACT

A method and apparatus for providing handover between carriers of different duplex frequency separation distances is provided. A mobile terminal is configured to operate in both fixed and variable duplex. The ability operate with unpaired up-link and down-link frequency carrier pairs, when necessary, makes it possible to significantly increase the spectrum utilization (capacity) in a cellular system using asymmetric up-link and down-link for example in WCDMA systems.

8 Claims, 6 Drawing Sheets

MOBILE TERMINAL FOR OPTIMAL SPECTRUM UTILIZATION IN CELLULAR SYSTEMS

This application claims priority under 35 U.S.C. § 119 to U.S. Provisional Application No. 60/361,338 entitled Mobile Terminal for Optimal Spectrum Utilization in Cellular Systems and filed on Mar. 5, 2002, and 60/336,715 entitled Radio Carrier Utilization for Cellular Services and filed on Dec. 7, 2001 the entire content of which is hereby incorporated by reference.

FIELD OF THE INVENTION

The invention relates to radio carrier utilization in cellular systems and more specifically to a mobile terminal for use in an asymmetric cellular system.

BACKGROUND

In today's competitive environment, a cellular system operator needs to carry as much traffic as possible on his spectrum without degrading service quality. Furthermore, an operator needs to provide coverage over large areas with modest traffic, as well as smaller areas with very high localized traffic, often referred to as "hot spots". This is traditionally solved by having an hierarchical or overlay/underlay cell structure wherein a number of smaller pico or micro cells are provided within the coverage area of a larger macro cell. By providing handover between the cell structures, the small cells will only be needed where traffic demands are very high, or where the coverage from a macro cell is marginal, for example, in some indoor sites such as airports, railway stations and office buildings.

Traditionally, operators employing overlay/underlay cell infrastructures, such as that shown in FIG. 1, use different radio communication carriers for each cell layer in order to reduce mutual interference between the cell layers. This a natural technique for operators of more narrow band cellular standards, as a relatively large number of carriers are available to each operator. However, assigning different carrier pairs is difficult to do when an operator only has two or three carrier pairs available, as can be the case in a wide-band CDMA (WCDMA) system. As a result, operators with a limited number of carriers allow the lower layers or pico cells to use some or all of the uplink and downlink carrier pairs assigned to the upper or macro cell. Therefore, operators employ one of the following two techniques, (A) they assign different uplink and downlink carrier pairs to the pico and macro cell or (B) they allow the pico cell to use some or all of the uplink downlink carrier pairs assigned to the macro cell.

One problem with using different up-link/down-link carrier pairs in each cell layer is that it can result in inefficient use of the spectrum. For example, if an operator only has access to a few carrier pairs, for example, 2, they are forced to decrease the capacity of their macro cell by 50 percent in order to load a lower/pico cell using a different carrier pair. As this is typically unacceptable to the operator, operators of these system typically reuse the same carrier pair in both layers of the infrastructure. This is feasible as long as the traffic in the underlay cell is low.

However, the underlay cell traffic can interfere with the macro cell traffic and can, with increasing cell traffic, gradually reduce the capacity of the macro cell beyond an acceptable level. Then, from a capacity point of view, the operator ends up with concept A, i.e., the carrier pair being used by the underlay cell will more or less be useless for the macro cell.

One method for improving the utilization of broad band RF carriers for overlay/underlay infrastructures in such systems and generally for asymmetric broadband data services is provided in copending application Ser. No. 10/233,663, titled "Flexible Carrier Utilization" (published as U.S. Patent Application Publication No. US 2003/0109284 A1 on Jun. 12, 2003), which is hereby incorporated by reference in its entirety.

The technique of the copending application improves the utilization of broad band RF carriers by allocating an extra frequency band, for example, an extra up-link, to the underlay cell as opposed to allocating a frequency pair. However, such a system solution needs a mobile terminal able to work with variable duplex, i.e., an unpaired UL and DL, when necessary.

In an asymmetric cellular system, for example WCDMA, the link from a mobile terminal to a base station, i.e., the uplink (UL) and the link from the base station to the mobile terminal, i.e., the down-link (DL), differs in terms of modulation, slot format, interleaving and coding. Furthermore, the frequency distance between the UL and DL is constant for all UL and DL pairs (i.e, they work in a fixed duplex mode). This means that the up-link and down-link frequency bands have a fixed separation in frequency, and if one of the links is moved to another frequency the other one is also moved to keep the fixed separation in frequency This can give rise to frequency spectrum utilization problems, as discussed above, since a change in the up-link will result in a change in the down link and vice versa. However, as discussed above, a capacity problem may exist in the uplink but not in the downlink. In other scenarios it can be the DL that has a capacity problem first while the UL is able to handle the current traffic. Therefore, there is a need for a method and apparatus able to solve the problem of one link with a telecommunication system having capacity problems while the corresponding link does not.

SUMMARY OF THE INVENTION

The invention solves the aforementioned problems by providing a method and apparatus capable of providing handover between carriers with different duplex frequency separation distances.

This is achieved by providing a mobile terminal capable of working with unpaired uplink and downlink carrier pairs when necessary. This makes it possible to significantly increase the spectrum utilization (capacity) in a cellular system using asymmetric up-link and down-link pairs.

BRIEF DESCRIPTION OF THE DRAWINGS

The objects and advantages of the invention will be understood by reading the detailed description in conjunction with the drawings, in which.

DETAILED DESCRIPTION OF THE INVENTION

Figure 1:
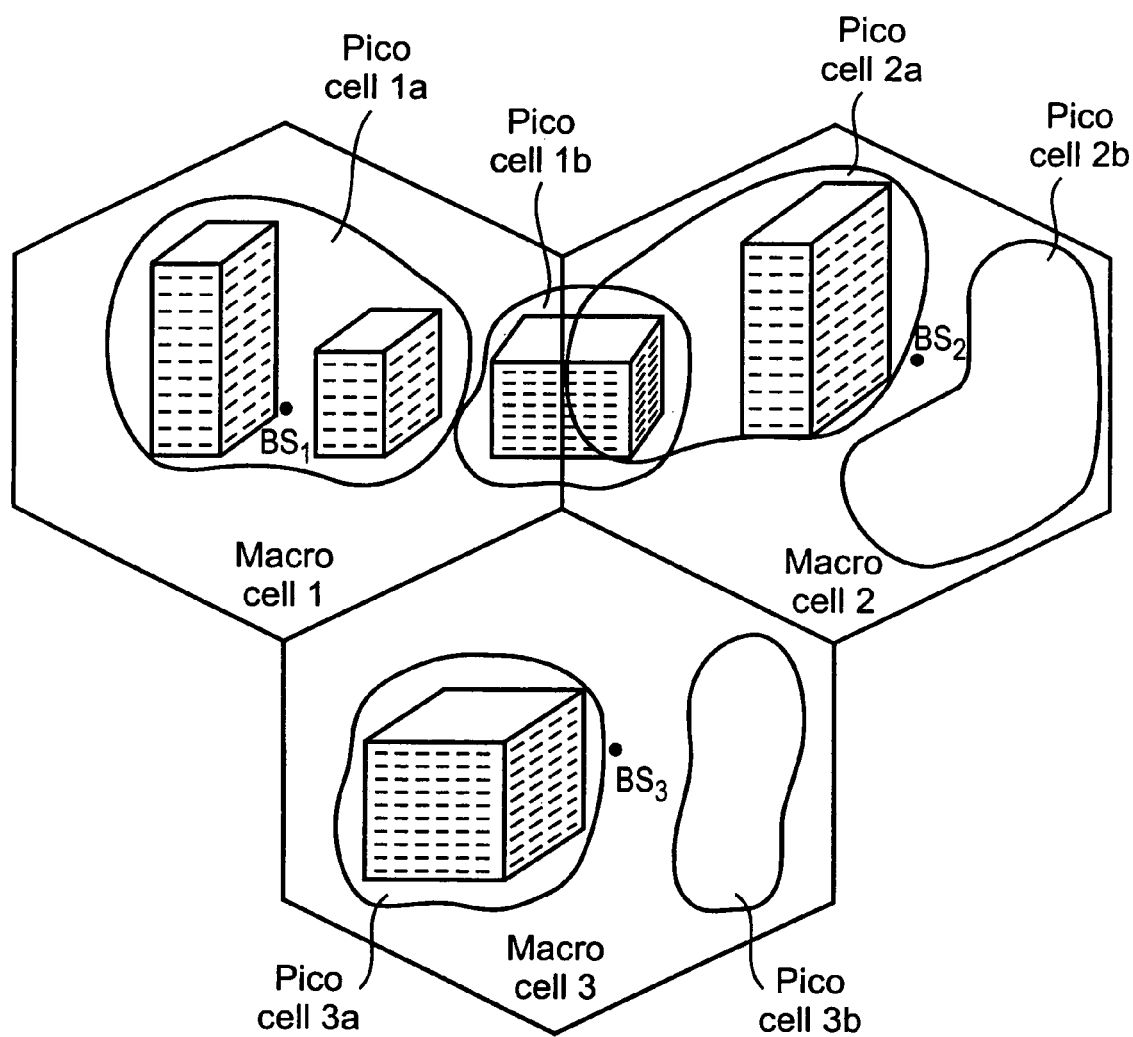
FIG. 1: illustrates a exemplary overlay network which can employ the apparatus of the invention.

The various features of the invention will now be described with respect to the figures, in which like parts are identified with the same reference characters.

In the following description, for purposes of explanation and not limitation, specific details are set forth, such as particular steps, algorithms, techniques, circuits and the like, in order to provide a thorough understanding of the invention. However, it will be apparent to one of ordinary skill in the art that the invention may be practiced in other embodiments that depart from these specific details. In other instances, detailed descriptions of well-known methods, devices, and circuits are omitted so as not to obscure the description of the invention with unnecessary detail.

These and other aspects of the invention will now be described in greater detail in connection with a number of exemplary embodiments. To facilitate an understanding of the invention, many aspects of the invention are described in terms of sequences of actions to be performed by elements of a computer system or apparatus. It will be recognized that in each of the embodiments, the various actions could be performed by specialized circuits, by program instructions being executed by one or more processors, or by a combination of both. Thus, the various aspects of the invention may be embodied in many different forms, and all such forms are contemplated to be within the scope of the invention.

The mobile terminal or user equipment (UE) according to the invention can in some situations move only one of the communication links in frequency. This implies the UE can operate with variable duplex, i.e., the frequency separation between up-link and down-link can be changed in certain situations. Accordingly, a UE in accordance with the invention can operate with both fixed and variable duplex. This allows the UE to move one of the links without necessarily moving the other. This is achieved by providing the UE with logic which allows the UE to switch between fixed and variable duplex.

Figure 2:
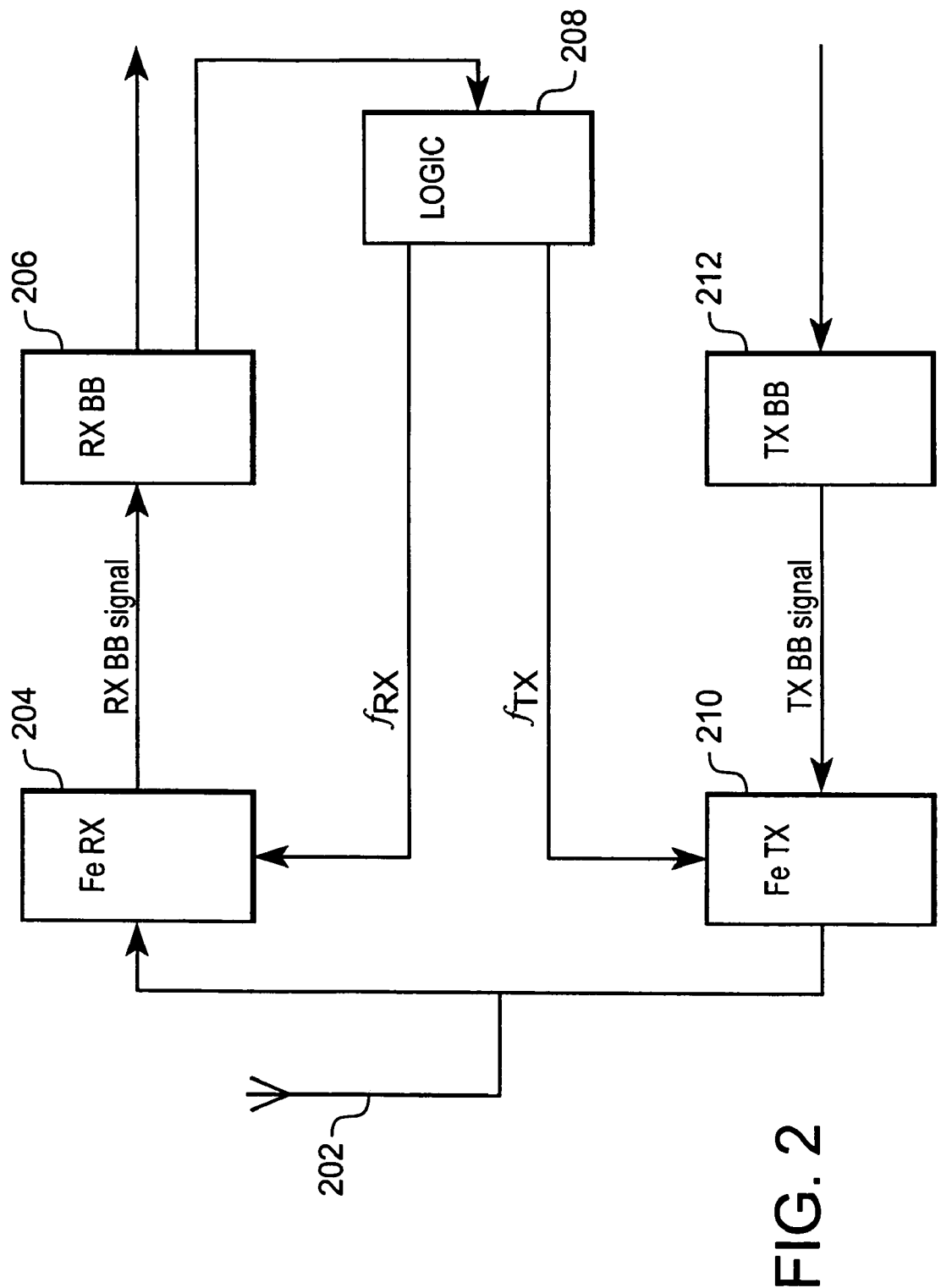
FIG. 2: illustrates a block diagram of a mobile terminal in accordance with the invention.

FIG. 2 illustrates a block diagram of a UE in accordance with the invention. The receiver portion of the UE includes a front-end receiver (Fe RX) 204 that down converts a received signal to a baseband signal (RX BB signal) and a baseband decoder 206 (RX BB) that decodes the baseband signal (RX BB signal). The UE also includes a coder 212 (TX BB)that generates symbols and pulse shape filters signals to be transmitted by the UE, and a front-end transmitter (Fe TX) 210 that up-converts the baseband TX signal to a radio signal for transmission by antenna 202. Furthermore, the UE includes logic 208 that allows the UE to switch between fixed and variable duplex.

Logic 208 changes the duplex distance, represented by the reference frequencies $f_{FX}$ and $f_{TX}$. Known systems, with fixed duplex, only require one reference frequency, which is fed to both the transmitter (Fe TX) and receiver (Fe RX) since the distance d between the uplink and downlink frequencies ($f_{TX}$, $f_{FX}$) is fixed for all carrier pairs. As a result the intermediate frequencies can be determined knowing only one of the frequencies ($f_{FX}$ or $f_{TX}$) and the fixed distance. However, this is not possible in a system where the duplex distance is not fixed. Accordingly, logic 208 of the UE in accordance with the invention, changes the duplex distance based on, for example, information signaled from the base station and decoded in the decoder 206 (RX BB).

Figure 3:
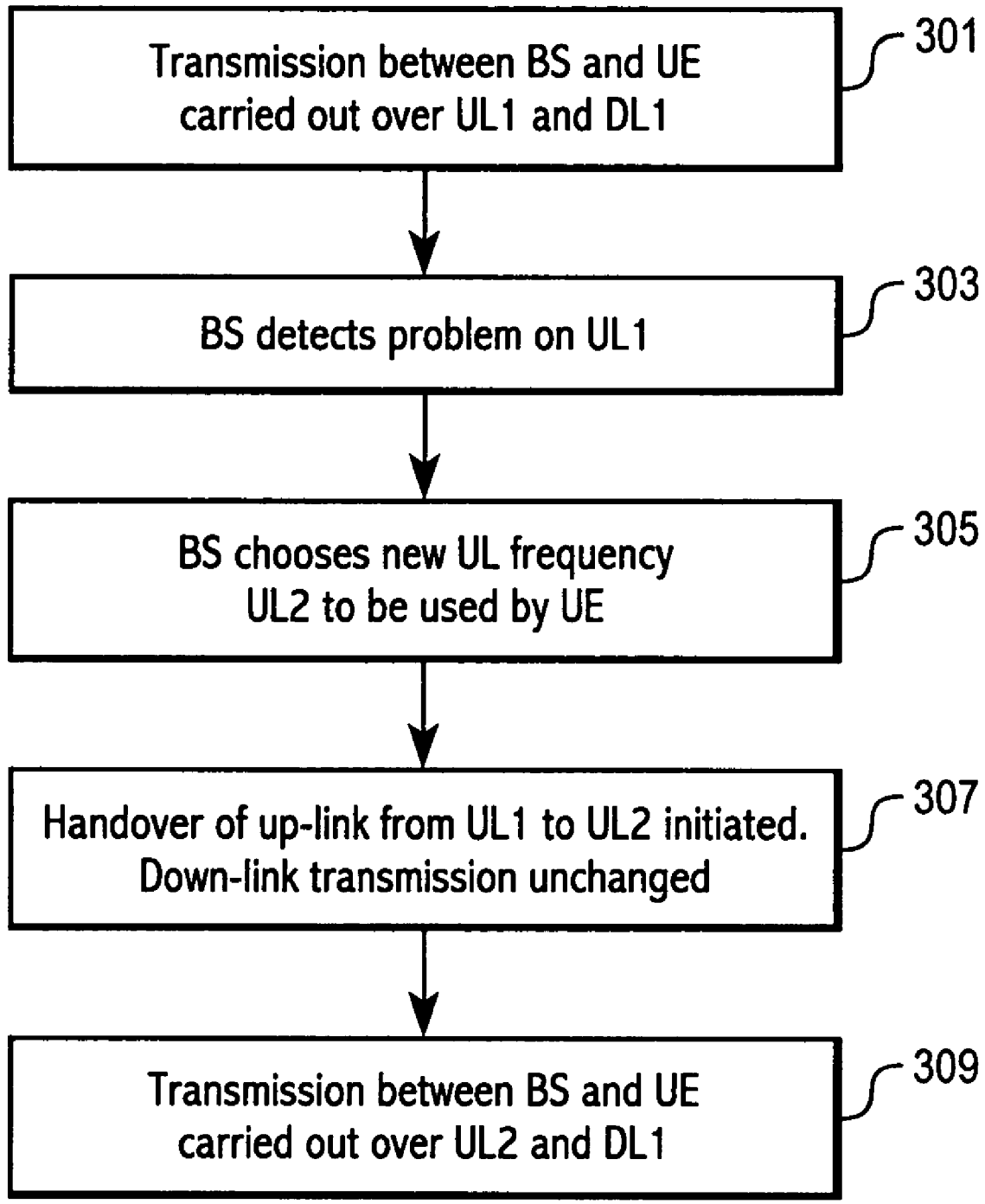
FIG. 3: illustrates a flow chart of a handover in accordance with an embodiment of the invention.
Figure 4:
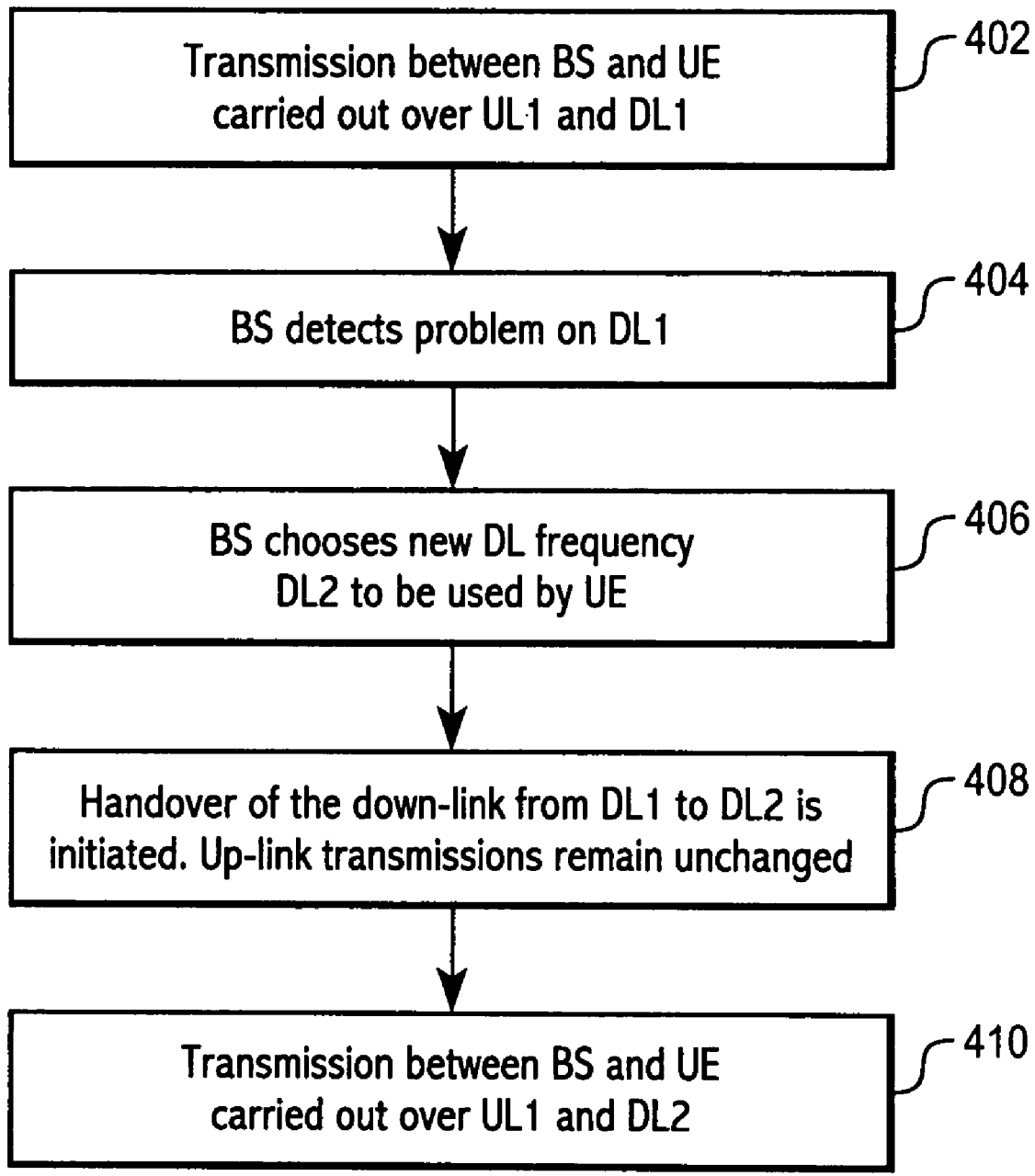
FIG. 4: illustrates a flow chart of a handover in accordance with another embodiment of the invention.

According to one embodiment of the invention, the UE can change to variable duplex operations due to capacity problems within the cell as illustrated in the flow charts of FIGS. 3 and 4. Capacity problems can be detected by the base station, for example, by detecting that the code tree is fully used, or that the interference levels in the system are high. While the capacity problems are most efficiently detected by the base station, the UE can also detect such problems by detecting high interference levels or that a wanted data rate is changed to a lower rate by the base station. If the base station detects the problem, it signals to the UE that is should initiate a handover of the up-link or down-link to another up-link or down-link frequency band. If the UE detects the problem it sends a request to the base station to be allowed to move the link to another frequency band. In either case, the link which is not being moved continues to operate.

FIG. 3 illustrates a flow chart of the situation wherein the base station determines that a problem exists in the up-link frequency. As illustrated in step 301, transmissions between the BS and the UE occur over an up-link frequency carrier UL1 and a down-link frequency carrier DL1. At step 303, the BS detects a problem, for example with capacity on UL1. As discussed above, the base station can detect capacity problems monitoring interference levels within the cell or by detecting that the code tree is fully used. The base station then determines a new up-link frequency UL2 at step 305. Then at step 307, handover of the UEs up-link transmissions from up-link frequency UL1 to up-link frequency UL2 is initiated, while the UE's down-link transmissions remain unchanged. Upon completion of the handover, transmissions are now carried out between the BS and UE using up-link frequency UL2 and down-link DL1 as indicated in step 309.

FIG. 4 illustrates a flow chart of the situation wherein the base station determines that a problem exists in the up-link frequency. As illustrated in step 402, transmissions between the BS and the UE occur over an up-link frequency carrier UL1 and a down-link frequency carrier DL1. At step 404, the BS detects a problem, for example, with capacity, on DL1. The base station then determines a new down-link frequency DL2 at step 406. Then at step 408, handover of the UE's down-link transmissions from down-link frequency DL1 to down-link frequency DL2 is initiated, while the UE's up-link transmissions remain unchanged. Upon completion of the handover, transmissions are now carried out between the BS and UE using up-link frequency UL1 and down-link DL2 as indicated in step 410.

During the process of moving the up-link/down-link frequency band discussed above with respect to FIGS. 3 and 4, the down-link/up-link frequency band, which is not moved, continues to operate. The gain of continuing the operation in the link that is not moved is that a higher throughput is achieved. This may involve that closed loop processes, such as power control, needs to operate in open loop mode until connection in the new up-link frequency band is established.

According to another embodiment of the invention, the UE can change to variable duplex operations due to initiation of a handover from a macro cell to an indoor pico cell wherein the frequency separation between up-link and down-link pairs is variable in the pico cell, as described in copending application discussed above.

Figure 5:
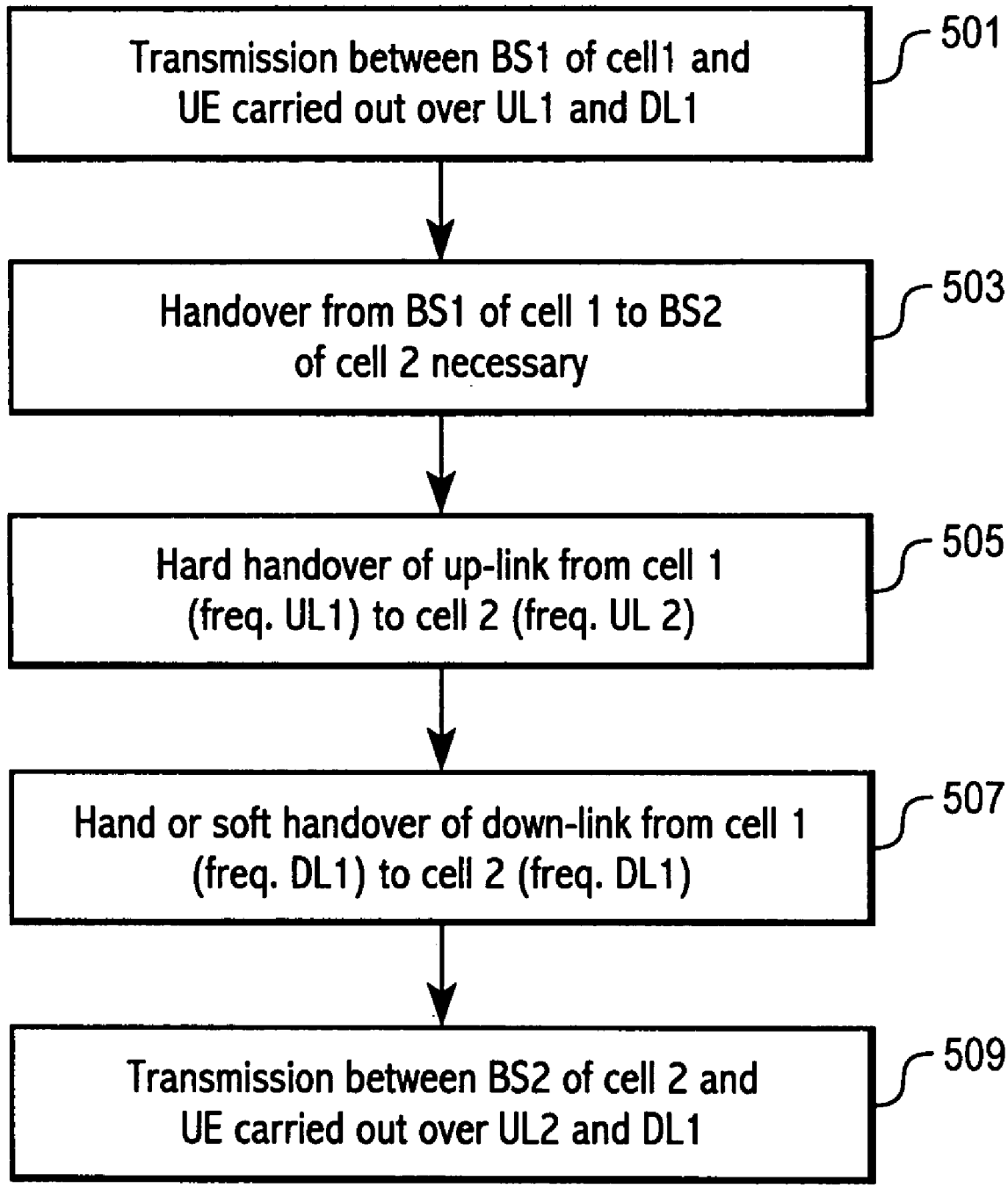
FIG. 5: illustrates a flow chart of a handover in accordance with another embodiment of the invention.

FIG. 5 illustrates a flow chart of the situation in which a UE is handover from a macro cell 1 to a pico cell 2 wherein the up-link and down-link frequency carriers of cell 2 employ different duplex frequency separation distances. Transmissions between the base station BS1 of cell 1 and the UE occur on an up-link frequency UL1 and a down-link frequency DL1 as shown in step 501. In step 503, it is determined that a handover to base station 2 of cell 2 is required. In step 505, a hard handover of the up-link from cell 1 frequency UL1 to cell 2 frequency UL2 is initiated. Then at step 507, a soft or hard handover of the down-link from cell 1 frequency DL1 to cell 2 frequency DL1 is initiated. Upon completion of the handover, transmissions are now carried out between the UE and BS2 of cell 2 using UL2 and DL1 as indicated in step 509.

Figure 6:
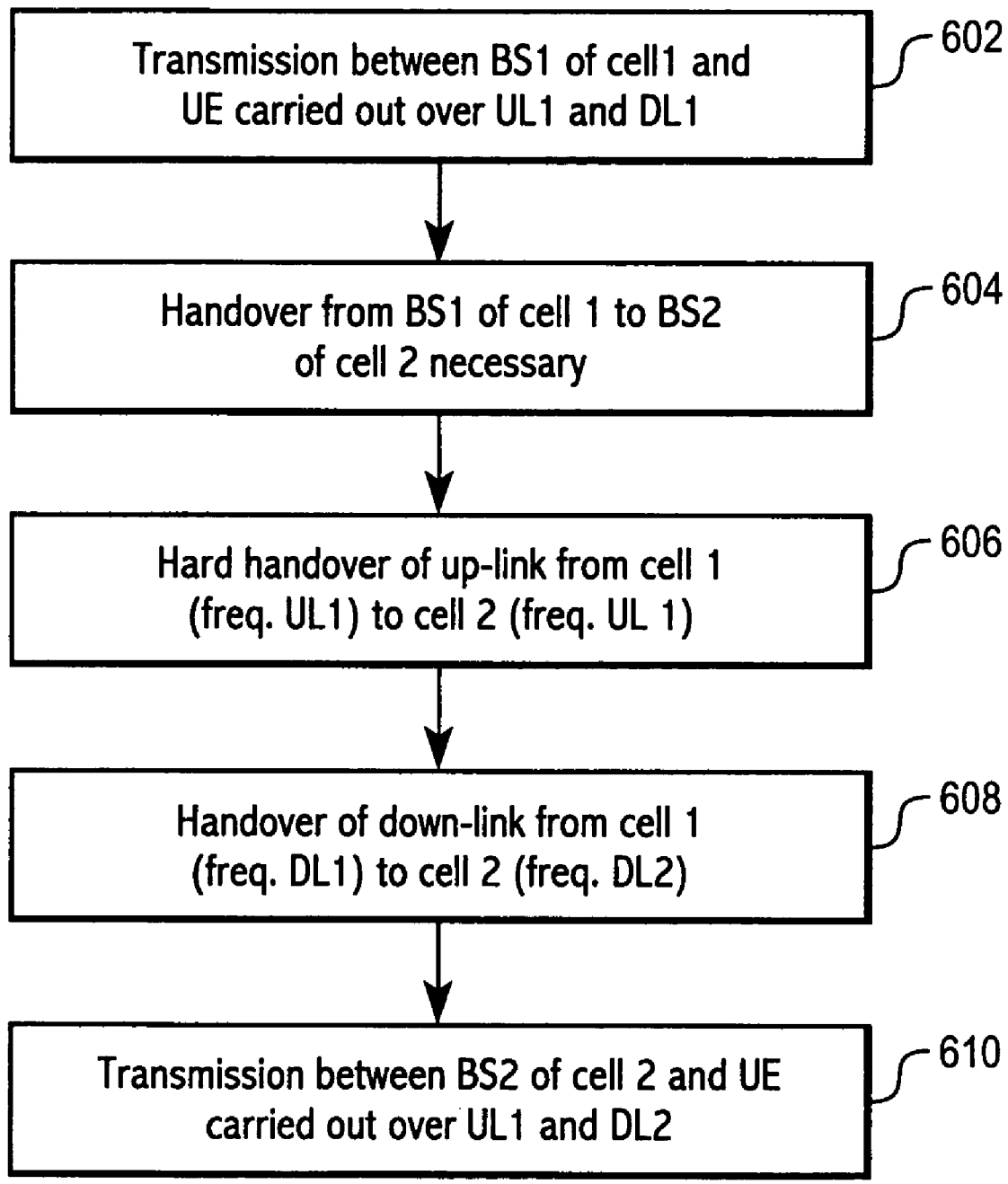
FIG. 6: illustrates a flow chart of a handover in accordance with another embodiment of the invention.

FIG. 6 illustrates a flow chart of the situation in which a handover from cell 1 to cell 2 with a change in the down-link frequency is carried out. As illustrated in step 602, transmissions between base station BS1 of cell 1 and the UE occur on an uplink frequency UL1 and a down-link frequency DL1. In step 604, it is determined that a handover to base station BS2 of cell 2 is required. In step 606, a hard handover of the up-link from cell 1 frequency UL1 to cell 2 frequency UL1 is initiated. Then at step 608 a hard handover of the down-link from cell 1 frequency DL1 to cell 2 frequency DL2 is initiated. Upon completion of the handover, transmissions are now carried out between the UE and BS2 of cell 2 using UL1 and DL2 as indicated in step 610.

The invention has been described with reference to particular embodiments. However, it will be readily apparent to those skilled in the art that it is possible to embody the invention in specific forms other than those of the preferred embodiments described above. This may be done without departing from the spirit of the invention.

For example, the situation can occur wherein both the up-link and down-link carrier frequencies are moved to frequencies with a new duplex distance within the same cell or when handover to another cell is required. Furthermore, the information required to switch to a variable duplex system may be transmitted over a broadcast channel as discussed in the copending application identified above. Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of handing over communications between a first base station and a mobile terminal to a second base station, the method comprising:
    transmitting information to the first base station on a first frequency carrier;
    receiving information from the first base station on a second frequency carrier;
    detecting that a handover from the first base station to the second base station is required;
    receiving information regarding a duplex separation distance between a third frequency carrier and a fourth frequency carrier associated with the second base station;
    transmitting information to the second base station on the third frequency carrier; and
    receiving information from the second base station on the fourth frequency carrier,
    wherein the information regarding the duplex separation distance is provided in a message from the second base station.

2. A method of handing over communications between a first base station and a mobile terminal to a second base station, the method comprising:
    transmitting information to the first base station on a first frequency carrier;
    receiving information from the first base station on a second frequency carrier;
    detecting that a handover from the first base station to the second base station is required;
    receiving information regarding a duplex separation distance between a third frequency carrier and a fourth frequency carrier associated with the second base station;
    transmitting information to the second base station on the third frequency carrier; and
    receiving information from the second base station on the fourth frequency carrier,
    wherein the information regarding the duplex separation distance is contained in an adjacent cell list.

3. A method of handing over communications between a base station and mobile terminal from a first carrier pair to a second carrier pair, the method comprising:
    transmitting information between the base station and mobile terminal over a first carrier pair, wherein the first carrier pair comprises a first up-link frequency and a first down-link frequency;
    detecting that a handover from the first carrier pair to a second carrier pair is required;
    receiving information regarding a frequency separation of the second carrier pair; and
    transmitting information between the base station and mobile terminal over a second carrier pair, wherein the second carrier pair comprises a second up-link frequency and a second down-link frequency,
    wherein the mobile terminal detects that the handover from the first carrier pair to the second carrier pair is required, and
    wherein detecting that a handover from the first carrier pair to a second carrier pair is required comprises detecting that a wanted data rate is changed to a lower rate by the base station.

4. A method of handing over communications between a base station and mobile terminal from a first carrier pair to a second carrier pair, the method comprising:
    transmitting information between the base station and mobile terminal over a first carrier pair, wherein the first carrier pair comprises a first up-link frequency and a first down-link frequency;
    detecting that a handover from the first carrier pair to a second carrier pair is required;
    receiving information regarding a frequency separation of the second carrier pair; and
    transmitting information between the base station and mobile terminal over a second carrier pair, wherein the second carrier pair comprises a second up-link frequency and a second down-link frequency,
    wherein the base station detects that the handover from the first carrier pair to the second carrier pair is required, and
    wherein detecting that a handover from the first carrier pair to a second carrier pair is required comprises detecting that a code tree is fully used.

5. A mobile terminal for use in a telecommunications system comprising a first base station and a second base station, the mobile terminal comprising:
    means for transmitting information to the first base station on a first frequency carrier;
    means for receiving information from the first base station on a second frequency carrier:
    means for detecting a handover from the first base station to the second base station is required;
    means for receiving a message from the second base station, the message containing information regarding a duplex separation distance between a third frequency carrier and a fourth frequency carrier associated with the second base station;

means for transmitting information to the second base station on the third frequency carrier; and means for receiving information from the second base station on the fourth frequency carrier.

6. A mobile terminal for use in a telecommunications system comprising a first base station and a second base station, the mobile terminal comprising:

means for transmitting information to the first base station on a first frequency carrier;

means for receiving information from the first base station on a second frequency carrier;

means for detecting that a handover from the first base station to the second base station is required;

means for receiving information regarding a duplex separation distance between a third frequency carrier and a fourth frequency carrier associated with the second base station;

means for transmitting information to the second base station on the third frequency carrier; and means for receiving information from the second base station on the fourth frequency carrier, wherein the information regarding the duplex separation distance is contained in an adjacent cell list.

7. A mobile terminal for use in a telecommunications system comprising a base station, the mobile terminal comprising:

means for exchanging information between the base station and the mobile terminal over a first carrier pair, wherein the first carrier pair comprises a first up-link frequency and a first down-link frequency;

means for detecting that a handover from the first carrier pair to a second carrier pair is required;

means for receiving information regarding a frequency separation of the second carrier pair;

means for exchanging information between the base station and mobile terminal over a second carrier pair, wherein the second carrier pair comprises a second up-link frequency and a second down-link frequency, wherein the means for detecting that the handover from the first carrier pair to a second carrier pair is required comprises means for detecting that a wanted data rate is changed to a lower rate by the base station.

8. A base station for use in a telecommunications system comprising a mobile terminal, the base station comprising:

means for exchanging information between the base station and the mobile terminal over a first carrier pair, wherein the first carrier pair comprises a first up-link frequency and a first down-link frequency;

means for detecting that a handover from the first carrier pair to a second carrier pair is required;

means for receiving information regarding a frequency separation of the second carrier pair; and means for exchanging information between the base station and mobile terminal over a second carrier pair, wherein the second carrier pair comprises a second up-link frequency and a second down-link frequency, wherein the means for detecting that the handover from the first carrier pair to the second carrier pair is required comprises means for detecting that a code tree is fully used.

* * * * *